United States Patent [19]
Steinberg et al.

[11] Patent Number: 4,970,045
[45] Date of Patent: Nov. 13, 1990

[54] ROTATIONAL MOLDING OF ARTICLES HAVING IMPACT RESISTANCE

[75] Inventors: Albert H. Steinberg, Morris Plains; Paul W. Flood, Lake Hopatcong, both of N.J.

[73] Assignee: Allied-Signal Inc., Morris Township, Morris County, N.J.

[21] Appl. No.: 441,820

[22] Filed: Nov. 15, 1982

[51] Int. Cl.$^5$ .............................................. B28B 1/20
[52] U.S. Cl. ..................................... 264/310; 264/311
[58] Field of Search ................................. 264/310, 311

[56] References Cited
U.S. PATENT DOCUMENTS
3,845,163 10/1974 Murch.
4,174,358 11/1979 Epstein ................................. 525/183

FOREIGN PATENT DOCUMENTS
1103908 2/1968 United Kingdom ................ 264/255

Primary Examiner—James Derrington
Attorney, Agent, or Firm—Roger H. Criss

[57] ABSTRACT

The present invention is a method of rotationally molding an article having a layer made of polyamide composition. The method comprises the steps of melt blending a polyamide composition comprising the polyamide and a copolymer comprising units derived from an alpha-olefin of the formula $RCH=CH_2$ where R is H or an alkyl having from 1 to 8 carbon atoms and from 0.2 to 25 mole percent based on the alpha-olefin-acid copolymer of an alpha, beta-ethylenically unsaturated carboxylic acid having from 3 to 8 carbon atoms. The copolymer has from 10% to 90% of the carboxylic groups neutralized by metal ions. The melt blended composition is formed into particles, including pellets and powder, suitable for rotational molding. The particles are rotationally molded to form an article.

9 Claims, No Drawings

ROTATIONAL MOLDING OF ARTICLES HAVING IMPACT RESISTANCE

BACKGROUND OF THE INVENTION

The present invention is in the field of rotational molding; more particularly, the invention relates to rotationally molded articles and a method to rotationally mold articles having a layer made of a composition containing a polyamide and an impact modifier.

Rotational molding, also known as rotomolding, is used in the manufacture of hollow objects from thermoplastics. In the basic process of rotational molding, solid or liquid polymers are placed in a mold. The mold is first heated and then cooled while being rotated about two perpendicular axes simultaneously. Many polymers can be used in the rotational molding process. Popular polymers for this use are polyolefins such as polyethylene. It is also known to use polycarbonates, crosslinkable polyethylene, nylon, and other materials. In selecting the rotational molding grade formulation, care must be taken to assure that there will not be thermal degradation during the heating cycle. A general discussion on rotational molding is given in MODERN PLASTICS ENCYCLOPEDIA 1979-1980, Volume 56, No. 10A, beginning at Page 381.

Many approaches have been taken to improve the physical properties of nylon molding compositions. U.S. Pat. No. 3,264,272, U.S. Pat. No. 3,845,163 and U.S. Pat. No. 4,174,358 illustrate the use of ionic copolymers in polyamide molding compositions to improve physical properties. U.S. Pat. Nos. 4,160,790 and 3,472,916 disclose polyamide molding compositions containing copolymers of ethylene and alkyl acrylate esters for improved physical properties.

Polyamide compositions are known which contain up to about 25 percent by weight of ethylene-ethyl acrylate copolymers and the zinc salt or sodium salt of ethylene methacrylic acid copolymer. In these compositions, there is more ethylene-ethyl acrylate copolymer than the salt of ethylene methacrylic acid copolymer. Specifically, these compositions contain from 13 percent to 23 percent by weight of ethylene-ethyl acrylate, and from one percent to 12 percent by weight of the zinc salt or sodium salt of ethylene methacrylic acid copolymer.

SUMMARY OF THE INVENTION

The present invention is a method of rotationally molding an article having a layer made of polyamide composition. The method comprises the steps of melt blending a polyamide composition comprising the polyamide and a copolymer comprising units derived from an alpha-olefin of the formula $RCH=CH_2$ where R is H or an alkyl having from 1 to 8 carbon atoms and from 0.2 to 25 mole percent based on the alpha-olefin-acid copolymer of an alpha, beta-ethylenically unsaturated carboxylic acid having from 3 to 8 carbon atoms. The copolymer has from 10% to 100% of the carboxylic groups neutralized by metal ions. Preferably the polyamide composition contains from 1 to 15 and more preferably 3 to 10 percent by weight of the copolymer. The melt blended composition is formed into particles, such as pellets and powder, suitable for rotational molding. The particles are rotationally molded to form an article.

The present invention includes a rotationally molded polyamide article made according to the process disclosed above.

DESCRIPTION OF THE PREFERRED EMBODIMENTS

The present invention is a method of rotationally molding an article having a layer made of a polyamide composition.

The polyamide composition is made by melt blending a polyamide and a copolymer comprising units derived from an alpha-olefin of the formula $RCH=CH_2$ wherein R is H or an alkyl having from 1 to 8 carbon atoms and from 0.2 to 25 mole percent based on the alpha-olefin-acid copolymer of an alpha, beta-ethylenically unsaturated carboxylic acid having from 3 to 8 carbon atoms. The copolymer has from 10% to 100% of the carboxylic acid groups neutralized by metal ions. There is preferably from 1 to 15 percent and more preferably from 3 to 10 percent by weight of the polyamide composition of the copolymer.

The melt polymer composition is formed into particles such as pellets or powders, which are suitable for rotational molding. The particles are used to rotationally mold an article.

Typically, the polyamide composition is melt blended in an extruder. Upon melt blending, the polyamide composition can be cooled using cooling water. Molten strands are extruded and pass into a bath of cooling water, usually at between tap and ambient temperature. The cooled composition then passes to a means to form such as a pelletizer or powder forming apparatus.

The term "polyamide" used in the practice of the present invention is intended to include long chain synthetic polymers which have regularly recurring amide groups as an integral part of the main polymer chain; and hence, include amide-ester copolymers. Suitable polyamides can be prepared by polymerization of a difunctional monomer or equivalently, its cyclized lactam (e.g., epsilon-aminocaproic acid or caprolactam, respectively) or by the reaction of a conjugate pair of monomers, for example, a diamide and a dicarboxylic acid (e.g., hexamethylenediamine and adipic acid), or a linear aminoaliphatic acid such as α-amino undecanoic acid.

Suitable polylactams can be produced by the polymerization of lactam monomers of the formula

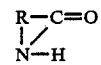

where R is an alkylene group having from 3 to 12 or more carbon atoms, preferably from 5 to 12 carbon atoms. A preferred monomer is epsiloncaprolactam having 5 carbon atoms in the alkylene group. Lactam monomers in addition to epsiloncaprolactam include pyrollidone, piperodone, valerolactam, caprylactam, lauryl lactam, etc. Also included are copolymers of two or more of the above or similar lactam monomers. Suitable diamines useful in the polymerization of polyamides include propanediamine, hexamethylenediamine, octamethylenediamine, etc. Suitable polycarboxylic acids include acids such as adipic acid, pimelic, suberic, sebacic, dodecaneoic, etc. Also included are copolymers or blends of polyamides of the above categories.

Typically, the number average molecular weight of these polymers is between about 10,000 and about 50,000, preferably 15,000 to 40,000 and more preferably 20,000 to 30,000. This is because mechanical properties improve rapidly until about 20,000, and processing starts to become more difficult above 30,000.

Polyepsiloncaprolactam is the preferred polyamide for use in the present invention. Polyepsiloncaprolactam suitable for use herein can contain a variety of terminal functionality. Preferred terminal functionality is that containing:

(a) A carboxyl group attached to both ends of the polyamide chain;

(b) A carboxyl group attached to one end and an acetamide group attached to the other end of the polyamide chain;

(c) An amine group attached to both ends of the polyamide chain; and (d) A carboxyl group attached to one end and an amino group attached to the other end of the polyamide chain.

It is preferred that the polyepsiloncaprolactam have more chain ends terminated by acid groups than by amine groups. During the polymerization to form polyepsiloncaprolactam, a controlled amount of azelaic acid results in a predetermined excess of polycaprolactam chain ends terminated by acid groups. Preferably, there are from 50 percent to 90 percent, and more preferably from 60 percent to 80 percent, of the end groups acid terminated. Preferably, the end groups are terminated with a dicarboxylic acid, such as azelaic acid. When this is the case, the composition can be rotationally molded in the presence of oxygen. However, it is preferred to use an inert, oxygen-free atmosphere, such as nitrogen or carbon dioxide, to prevent oxidation even where there is excess end groups terminated with carboxyl groups. If there are not more polyepsiloncaprolactam chain ends terminated with acid groups than with amine groups, an inert atmosphere is required for a satisfactory product. Otherwise, the composition is susceptible to oxidation resulting in loss of physical properties.

Polyamides other than polyepsiloncaprolactam can be used, but polyepsiloncaprolactam is preferred. For example, polyhexamethyleneadipamide has a higher melting temperature and flows with more difficulty than polyepsiloncaprolactam. The polyepsiloncaprolactam provides a lower melting, easier processing product wherein the pellets of material flow or knit more readily into each other.

The composition can contain a heat stabilizer which is preferably a copper compound. The copper compound can be an organic or inorganic copper salt with the copper in cupric or cuprous form. A preferred organic salt is cupric acetate. Preferred inorganic salts are copper halides, including cuprous iodide, and cupric and cuprous chloride. The most preferred copper salt is cuprous iodide. There is from about 0.001 percent to about 0.5 percent by weight, or preferably from about 0.01 to about 0.05 percent by weight of the copper compound, preferably cuprous iodide. Additonally, when a copper compound is used it is preferred to also use potassium iodide. There can be from 0.001 to 0.3 and preferably 0.01 to 0.1 percent potassium iodide.

The polyepsiloncaprolactam composition of this invention does not require the use of a plasticizer for successful rotational molding, although caprolactam can be used as a plasticizer. A small amount of plasticizer, such as caprolactam monomer, can deposit on the mold and must be washed off.

When polyepsiloncaprolactam is polymerized, about 8 percent to about 12 percent of the caprolactam monomer remains. This monomer can be left in the polyepsiloncaprolactam to act as a plasticizer, or it can be leached out with water. The leached polycaprolactam contains only about 1 percent to 2 percent of the caprolactam monomer.

The ionic copolymer can be a random ionic copolymer of an alpha-olefin of the formula $RCH=CH_2$ where R is H or alkyl radicals having from 1 to 8 carbon atoms, and an alpha,beta-ethylenically unsaturated carboxylic acid having from 3 to 8 carbon atoms. The ionic copolymer has at least 10 percent of the carboxyl acid groups neutralized with metal ions. Random ionic copolymers which can be used in the composition of the present invention are described in U.S. Pat. No. 3,264,272, which is incorporated herein by reference.

The cations of metals which are suitable in forming the ionic copolymers which can be used in the present invention can include mono-, di- and trivalent ions of metals and Groups I, II, III, IV-A and VIII of the Periodic Table of the Elements. Suitable monovalent cations include cations of sodium, potassium, lithium, cesium, silver, mercury, and copper. Suitable divalent cations include the cations of beryllium, magnesium, calcium, strontium, barium, copper, cadmium, mercury, tin, lead, iron, cobalt, nickel, and zinc. Suitable trivalent cations include the cations of aluminum, scandium, and iron. For the purposes of the composition of the present invention, the most preferred metal cation used to form the ionic copolymer is the cation of zinc.

The degree of neutralization of the ionic copolymer by the metal cations should be at least 10 percent of the carboxylic acid groups. It is generally desirable to neutralize at least 50 percent of the acid groups. The degree of neutralization may be measured by several techniques known in the art, such as infrared analysis or titration. These techniques are disclosed at Pages 74–75 in "Ionic Copolymers" by L. Holliday, published by John Wiley and Sons, New York and Toronto (1975).

The copolymers which can be used to form the ionic copolymers of the present invention are preferably copolymers of ethylene and an alpha,beta-ethylenically unsaturated carboxylic acid. Alpha,beta-ethylenically unsaturated carboxylic acids which can be polymerized with the ethylene include acrylic acid, methacrylic acid, itaconic acid, and ethacrylic acid. Further, the ionic copolymers can be copolymers of the type described and used in U.S. Patent No. 4,174,358, which is incorporated herein by reference.

Other known polyamide impact modifiers and combinations of impact modifiers can be used. Included are those discussed in the Background of the Invention section. In addition to the copolymer described above, ester copolymers can be used. A preferred ester copolymer is that of ethylene and an ester selected from the group of alkyl esters of alpha, betaethylenically unsaturated carboxylic acids having 3 to 8 carbon atoms, wherein the alkyl group contains 1 to 4 carbon atoms. Examples of such esters include methyl, ethyl, propyl, isopropyl, butyl, isobutyl, and t-butyl esters of the carboxylic acids. The preferred esters are methylacrylate, ethyl acrylate, and methyl methacrylate and ethyl methacrylate. More preferred are ethyl acrylate and ethyl methacrylate, with ethyl acrylate being the most preferred.

The polyamide composition blends of the present invention can be combined into a uniform mixture by melt blending on conventional equipment such as a Banbury internal mixer, mill mixing, extruder, or the like. Alternately, the blends may be made by solution blending or by dry mixing together of the components followed by melt fabrication of the dry mixture by extrusion or injection molding. In the case of injection molding of dry mixtures, screw preplastication or other method of giving good mixing should be employed. Preferably the polyamide composition is melt blended in an extruder with the molten extrudate preferably in the form of strands passing through a cooling means such as a water bath and then pelletized.

The cooling water can be at any temperature greater than 0° Centigrade up to 50° Centigrade but is preferably at the temperature available from the tap. Typically the cooling water is from 5 degrees Centigrade to 20 degrees Centigrade.

After cooling, the blended polyamide composition is dried. Preferably the polyamide is air dried as it proceeds over various support means to be formed into particles suitable for rotational molding. Optionally, the polyamide can be dried by hot inert gases such as nitrogen, or under a vacuum. The polyamide composition can be formed into pellets using pelletizers, alternately it could be ground powder.

The polyamide composition can be fed into the mold in powder or pellet form. If the polyepsiloncaprolactam particles are too small, their surface area is so large that exposure to the atmosphere results in excessive moisture pickup. It is preferred to use pellets which are not as sensitive to moisture pickup. If the polyepsiloncaprolactam particles are too large, it takes a longer time for them to melt and thinner parts cannot be made. Pellets can be from about 1/32 by 1/32 inch (or about 1/32 inch average diameter) to about ⅛ by ⅛ inch (or about ⅛ inch average diameter). A preferred pellet shape is a cylindrical pellet from about 1/32 to 1/16 inch in diameter, by about 1/16 to ⅛ inch long. The powder can be as small as 35 mesh with a 12 mesh powder preferred.

The composition is formed into particles suitable for rotational molding and is fed into the rotational mold. The composition is heated within the mold as it is rotated. Typically, the mold is indexed into an oven and heated with hot air while the mold rotates. Generally, the rotational mold rotates simultaneously along two perpendicular axes. The mold is heated until the particles within the mold melt and flow together on the inside surface of the mold. The mold is then cooled and the molded article is removed.

The polyamide composition can be processed in most commercial rotational molding machines. The oven air temperatures range during the heating step from about 288° C. (550° F.) to about 399° C. (750° F.), and preferably from about 302° C. (575° F.) to about 352° C. (675° F.). If the temperature is too high during rotational molding, the impact properties deteriorate. The temperature must be high enough for the particles to fuse together to form a smooth inner surface of the molded article. The mold is heated by suitable means known in the art. Generally, the mold rotates within a forced air circulating oven.

After the heating step the mold is cooled. The part must be cool enough to be easily removed from the mold and retain its shape. Preferably, the mold is removed from the oven while continuing to rotate. Cool air is first blown on the mold. The air can be at ambient temperature. Cool air is initially used to prevent the mold from experiencing thermal shock. The initial cool air step prevents part warpage, and premature release of the part from the mold surface which can cause stresses in the part. After the air has started to cool the mold for a controlled time period, a water spray can be used. The water cools the mold more rapidly. The water used can be at cold water tap temperature, usually from about 4° C. (40° F.) to about 16° C. (60° F.). The water step is used to cool the part rapidly. It is believed this reduces the formation of crystals and enhances impact resistance of the part. After the water cooling step, another air cooling step may optionally be used. This is usually a short step during which the equipment dries with heat removed during the evaporation of the water.

The composition in the method of the present invention provides greater flexibility during cooling. A rotationally molded article made with the composition used in the process of the present invention can be cooled using the above described process. However, it has been found that an article made of the composition of the present invention maintains high impact values even during slow cooling. This is a particular advantage where it is desired to only air cool parts in the mold, or on machines where water cooling is not available. It also allows the article to be cooled until the composition solidifies to just below the melt temperature and be removed from the mold hot and allowed to complete cooling in air. Preferably the article is cooled to below its melt temperature. The article can be cooled to within 75° F. below its melt temperature and removed from the mold. Articles can be removed using the composition of the present invention at temperatures of up to about 350° F. and temperatures between 250° F. and 350° F. The solidified article can then be removed from the mold and cooled in air or in water. This frees the mold more quickly to be reused. The mold is ready for the next molding at a higher temperature.

The improved cooling step of using the composition of the present invention allows a rotationally molded part to have a shorter cooling time in the mold using air and/or water cooling. For example, a mold containing a part up to 5/16 inch thick can be cooled in forced ambient air for 10 minutes followed by sprayed tap water for 5 minutes and then removed from the mold and allowed to cool in air. Such a part would maintain satisfactory impact resistance.

The heating and cooling cycle times will depend on the equipment used and the article molded. Specific factors include the part thickness and mold material. Typical conditions for a ⅛ inch (0.318 cm) thick part in a steel mold are to heat the part in an oven with air at about 343° C. (650° F.) for about 22 minutes. The part is cooled in ambient temperature forced air for about 5 minutes and then in a tap water spray at about 10° C. (50° F.) for about 5 minutes. Optionally, the part is cooled in ambient temperature forced air for an additional 2 minutes.

During the heating and cooling steps, the mold containing the molded article is continually rotated along two perpendicular axes. The rate of rotation of the mold about each axis is limited by machine capability and the shape of the article being molded. A typical range of operation which can be used with the present invention is to have a ratio of rotation of the major axis to the minor axis of from 1:2 to 1:10, and 2:1 to 10:1.

Preferably, the rotational molding is conducted under an inert atmosphere within the mold. However, this is not necessary, although it is preferred when using the preferred composition containing polyepsiloncaprolactam having an excess of chain ends terminated by a dicarboxylic acid group. When it is desired to use an inert atmosphere, the mold cavity can be purged with nitrogen. Most rotational molding machines have arms which are drilled for gas injection, so that all that is necessary is to connect a nitrogen gas cylinder to the arm, using the rotary valves in the connection. Alternatively, dry ice can be added to the mold cavity at the time the resin is charged to the mold. The dry ice will sublime during the heating cycle and provide an inert atmosphere.

The mold surface can be sprayed or coated with a mold release coating. A preferred mold release agent is a baked-on silicon based mold release coating, such as Freekote ®. This coating is baked for 15-20 minutes at about 288° C. (550° F.) to 345° C. (650° F.). The mold is cooled and sanded on the inside. The sanded surface allows the composition too maintain contact during molding and not release to readily and warp while being cooled. Yet upon cooling, the molded article easily releases. A vent can be used to avoid pressure buildup on the inside of the mold during the heating step.

The present invention includes rotationally molded polyamide articles having a polyamide layer which comprises the polyamide composition as described above. The article made of the present invention maintains higher impact at low temperatures than articles using a polyamide composition without the copolymer.

Several examples are set forth below to illustrate the nature of the invention and the manner of carrying it out. However, the invention should not be considered as being limited to the details thereof. All parts are percent by weight unless otherwise indicated. The physical test results were obtained using the following procedure: drop weight impact - ASTM D-3029 with a 3 inch specimen support.

In the following examples a McNeil-Akron Model No. 500/48 Laboratory Rotational Molding Machine was used. This machine has a 500 lb. capacity and a 48 inch swing envelope. The mold rotates simultaneously about 2 perpendicular axes, a major axis and a minor axis. The moldings made were 16 inch cubes and 12 inch cubes. The mold for the 12 inch cube was made of cast aluminium and the mold for the 16 inch cube was made of stainless steel. The molds was equipped with a gas inlet port and a vent port. Polymer was charged when the mold was open.

In all of the examples the polyamide used was polyepsiloncaprolactam having more chain ends terminated with azelaic acid than amine groups. The polyepsiloncaprolactam had about 45 milliequivalents (m.eq.) of carboxyl and about 20 m.eq. amine terminated end groups per kilogram of polyepsiloncaprolactam. The polyepsiloncaprolactam has an estimated formic acid relative viscosity of from about 65 to about 80. The polyepsiloncaprolactam was washed in water to remove unreacted caprolactam monomer. About 1.5% caprolactam remains. The polyepsiloncaprolactam contained about 0.02 percent by weight of cuprous iodide.

The ionic copolymer used was Surlyn ®1801, ethylene methacrylic acid neutralized with zinc ions sold by the Dupont Company.

In each of the examples the following process was generally followed with specific details and variations noted with each example.

The mold was charged with ⅛ inch (0.32 cm) long by 1/16 inch (0.16 cm) diameter cylindrical polymer pellets and closed. Nitrogen was introduced to displace air in the mold and a slow purge maintained throughout the cycle. The vent was open to the atmosphere and plugged loosely with fiberglass to prevent molding powder from escaping.

The mold was indexed into the heating oven set at a desired temperature and rotated biaxially for a given amount of time at a rotation ratio of 4.1 and major axis speed of 6 rpm. The rotation ratio is defined as the number of rotations made by the major axis for one rotation of the mold (or minor axis). At the end of the first heat cycle the mold was indexed back out of the work area while rotating. The mold was indexed into the cooling station and cooled while being biaxially rotated and finally the part was removed.

EXAMPLE 1

Ten pounds of a pelletized composition comprising polyepsiloncaprolactam, 5 percent by weight of Surlyn ®1801, 0.1 percent potassium iodide, and 80 ppm of copper of which 20 ppm are from copper acetate and 60 ppm are from copper iodide, was fed into the 16 inch cube mold to form a 16 inch cube having a ⅛ inch wall thickness. The mold was rotated and heated at 650° F. for 22 minutes in the hot air oven. The mold was then indexed to the cooling air and the mold cooled in ambient forced air for 5 minutes followed by a water spray for 10 minutes using tap water while the mold rotated. Finally, forced air was blown on the mold for 2 minutes. Drop weight impact values were measured at −40° F., 0° F., and 32° F. Results are summarized on Table 1. The results in Table 1 show that the composition of Example 1 has a higher impact resistance at cold temperatures than the comparatives and that the composition of Example 1 maintains a higher level of impact resistance at lower temperatures.

Comparatives 1, 2

Example 1 was repeated using 10 pounds of the composition used in Example 1 except that no Surlyn ® 1801 was included. The Comparative was repeated as Comparatives 1 and 2. Impact results were measured and are summarized on Table 1.

TABLE 1

|  | IMPACT - (foot-pounds) | | |
| --- | --- | --- | --- |
|  | −40° F. | 0° F. | 32° F. |
| Ex. 1 | 50 | 61 | 74 |
| Comp. 1 | 13 | 24 | 25 |
| Comp. 2 | 24 | 41 | 58 |

EXAMPLES 2, 3

Ten pounds of a pelletized composition of the type used in Example 1 plus about 0.2 percent of magnesium oxide to help improve impact was fed into the 16 inch cube mold to form 16 inch cubes having a 1/8 inch wall thickness. The mold was rotated and heated for 22 minutes at 650° F. In Example 2, the mold was cooled using the procedure of Example 1. In Example 3, the mold was cooled in forced air for 40 minutes while the mold rotated. In both cases the cube released satisfactorily and had good appearance. Drop weight impact was measured at room temperature. Results summarized on Table 2 show that the process of cooling in Example 3 resulted in a cube which maintained a relatively high impact resistance.

TABLE 2

| | Cooling (min) | | | Drop Wt. Impact |
|---|---|---|---|---|
| | Air | Water | Air | (foot-pounds) |
| Ex. 2 | 5 | 10 | 2 | 168 |
| Ex. 3 | 40 | — | — | 136 |

COMPARATIVES 3, 4

The composition of Comparatives 1 and 2 was pelletized and fed into the 12 inch cube mold to form 12 inch cubes having a wall thickness of 0.200 inches. The mold was rotated and heated for 30 minutes at 650° F. The mold was indexed to the cooling area. In Comparative 3 the mold was cooled in ambient forced air for 10 minutes followed by a water spray for 30 minutes while the mold continued to rotate. Finally, forced air was blown on the mold for 2 minutes. In Comparative 4 the mold was cooled while rotating in ambient forced air for 40 minutes. Drop weight impact values were measured and are summarized on Table 3.

TABLE 3

| | Cooling (min) | | | Drop Wt. Impact |
|---|---|---|---|---|
| | Air | Water | Air | (foot-pounds) |
| Comp. 3 | 10 | 30 | 2 | 125 |
| Comp. 4 | 40 | — | — | 48 |

These results show that the Comparative composition loses impact to a greater extent than the composition of the present invention when cooled more slowly (in air) after being rotationally molded.

I claim:

1. A method of rotationally molding an article having a polyamide layer comprising the steps of:
    melt blending a polyamide composition comprising the polyamide and a copolymer comprising units derived from an alpha-olefin of the formula $RCH=CH_2$ wherein R is H or an alkyl having from 1 to 8 carbon atoms and from 0.2 to 25 mole percent based on the alpha-olefin-acid copolymer of an alpha beta-ethylentically unsaturated carboxylic acid having 3 to 8 carbon atoms, the copolymer having from 10% to 100% of the carboxylic acid groups neutralized by metal ions;
    feeding the composition to the cavity of a rotational mold;
    rotating the mold;
    heating the composition within the mold;
    cooling the mold; and
    removing the article from the mold when it has solidified and has cooled to a temperature no less than 75° F. below the melting temperature of the composition and the cooling of the article continuous outside of the mold.

2. The method of recited in claim 1 wherein the copolymer is derived from ethylene and methacrylic acid, neutralized from 10% to 100% by zinc ions.

3. The method as recited in claim 1 wherein the composition comprises from 1 to 15 percent by weight of the copolymer.

4. The method as recited in claim 3 wherein the composition comprises from 3 to 10 percent weight of the copolymer.

5. The method as recited in claim 1 wherein the polyamide is polyepsiloncaprolactam.

6. The method as recited in claim 1 further comprising the step of forming the composition into particles suitable for rotational molding.

7. The method as recited in claim 1 where the article is removed from the mold at between 250° F. and 350° F.

8. The method as recited in claim 6 wherein the mold is air cooled.

9. The method as recited in claim 1 wherein the melt blended composition is cooled using cooling water.

* * * * *